United States Patent [19]

Grider

[11] Patent Number: 4,709,784
[45] Date of Patent: Dec. 1, 1987

[54] APPARATUS FOR AIDING IN LOADING A MOBILE WORK PLATFORM ONTO AN ELEVATED SURFACE

[76] Inventor: Lyle D. Grider, 25990 North Oak Hills Road, Barrington, Ill. 60010

[21] Appl. No.: 31,455

[22] Filed: Mar. 30, 1987

[51] Int. Cl.⁴ .............................................. E04G 1/24
[52] U.S. Cl. ...................................... 182/16; 182/63; 280/47.2
[58] Field of Search ...................... 182/63, 16, 127, 12, 182/17; 280/47.2

[56] References Cited

U.S. PATENT DOCUMENTS

| | | | |
|---|---|---|---|
| 970,690 | 9/1910 | Davis | 182/16 |
| 3,156,317 | 11/1964 | Lundeen | 182/16 |
| 3,499,659 | 3/1970 | Capadalis | 280/47.2 |
| 4,194,591 | 3/1980 | Fisher | 182/63 |
| 4,569,416 | 2/1986 | Stokoe | 182/63 |
| 4,592,447 | 6/1986 | Ream | 182/63 |
| 4,620,712 | 11/1986 | Blackwell | 280/47.2 |

Primary Examiner—Reinaldo P. Machado
Attorney, Agent, or Firm—Douglas B. White

[57] ABSTRACT

There is provided on the side of a mobile platform apparatus a surface engaging pivot in combination with side mounted wheels to grab an elevated surface and temporarily secure the apparatus during the process of loading the mobile platform onto the elevated surface. A high friction surface is provided on a pivot and wheels are mounted vertically above and protruding slightly beyond the pivot to accept the weight transfer only after the apparatus is substantially horizontal.

15 Claims, 5 Drawing Figures

APPARATUS FOR AIDING IN LOADING A MOBILE WORK PLATFORM ONTO AN ELEVATED SURFACE

BACKGROUND OF THE INVENTION

1. Field of the Invention

The present invention relates generally to mobile work platforms, sometimes referred to as moveable pedestal type scaffold units. More particularly this invention relates to an improvement which allows the loading of the apparatus onto an elevated surface.

2. Description of the Prior Art

Moveable work platforms generally have a base on wheels and an extensible mast portion mounted to the base and designed to extend upwards therefrom. These work platforms are typically difficult to move from one horizontal level to another, such as from the ground to a pick-up truck for transport. This is particularly true when only one or two persons are available to assist in the loading.

Prior methods for fascilitating loading are exemplified in the previously issued U.S. Pat. No. 4,592,447. In that reference a mobile work platform (moveable pedestal scaffold) is assisted in the function of laoding the mobile platform onto an elevated surface by the attachment of a frame structure to the side of the mobile platform. Wheels are mounted to the frame structure and positioned to carry the weight of the scaffold when it is positioned on its side. Unfortunately, when the scaffold is tilted upon its side for loading onto the elevated surface and the side mounted wheels contact the elevated surface, the apparatus is placed in an unstable and dangerous situation. While the wheels are useful to allow the rolling of the apparatus when it is on its side, this very same rolling tendency creates the dangerous movement and uncertainty when the apparatus is in the middle of the loading process.

A similar device is disclosed in the U.S. Pat. No. 4,620,712, where a side mounted wheel device is affixed to the side of a power table. This is claimed to make the power table portable in a pick-up truck. When the table is rolled to the rear gate of the truck, the table is tilted toward the truck until the side wheels contact the rear gate; whereupon the operator lifts until the full weight can be placed upon the side mounted wheels. Thereafter, the table is rolled on the bed of the truck by the combination of the side mounted rollers and a set of base mounted rollers. This system is substantially the same as the previously mentioned system (U.S. Pat. No. 4,592,447), and likewise creates the same dangerous instability in the middle of the loading process where the side mounted wheels cause the apparatus to roll when being lifted by the operator.

SUMMARY OF THE INVENTION

Generally there is provided on the side of a mobile work platform a surface engaging pivot in combination with side mounted wheels. The pivot grabs the elevated surface and temporarily secures the apparatus during the loading process. Particularly there is provided a structure mounted to the side of the mobile platform having a pivot mounted thereon and having wheels also mounted to this structure proximate the pivot. The wheels are arranged to protrude their outer circumference beyond the extension of the pivot, such that the weight of the apparatus may be transferred to the wheels when the mobile platform is on its side. In operation, the mobile platform is moved to a position next to an elevated surface and the pivot located just above and in contact with the elevated surface. The operator may then lift on the base of the mobile platform and using the pivot as a fulcrum tip the apparatus onto the elevated surface. After the apparatus has been lifted and laid over onto its side, the wheels mounted proximate the pivot carry the weight of the apparatus, whereby the mobile platform may be rolled along the truck bed. In a further aspect of the invention, the pivot and wheels may be relocated upwards and downwards along the side of the apparatus to accomodate any height of the truck bed.

DESCRIPTION OF THE PREFERRED EMBODIMENT

Figure 1A:
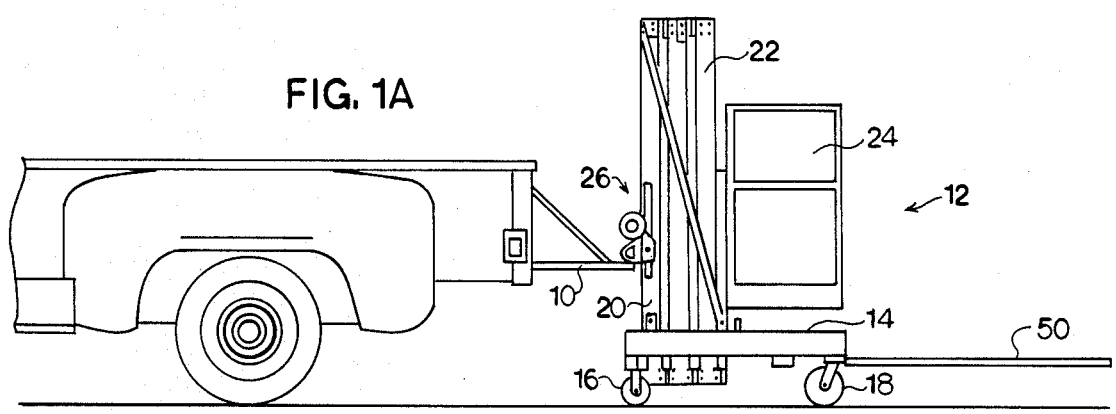
FIGS. 1A-1C represent side views of the mobile work platform being loaded upon an elevated surface (pick-up turck) by use of the pivot and wheel improvement of the present invention.
Figure 1B:
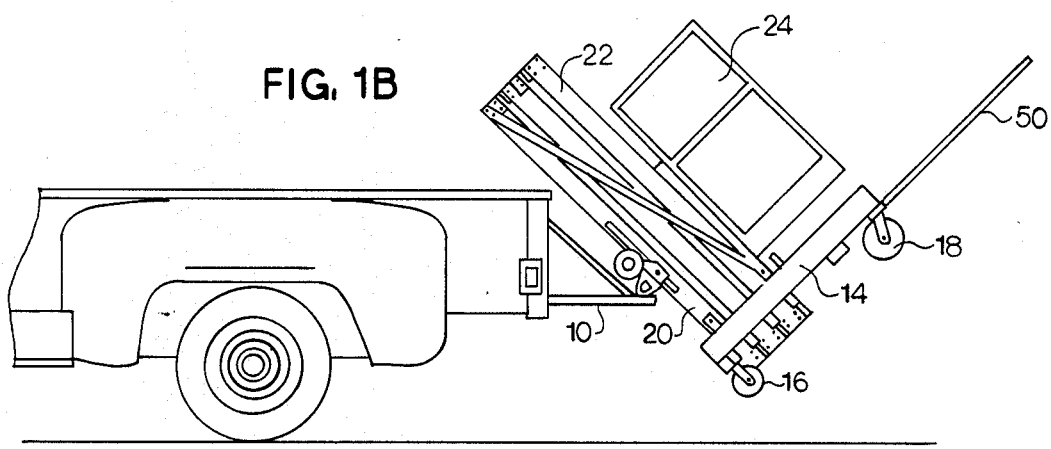
Figure 1C:
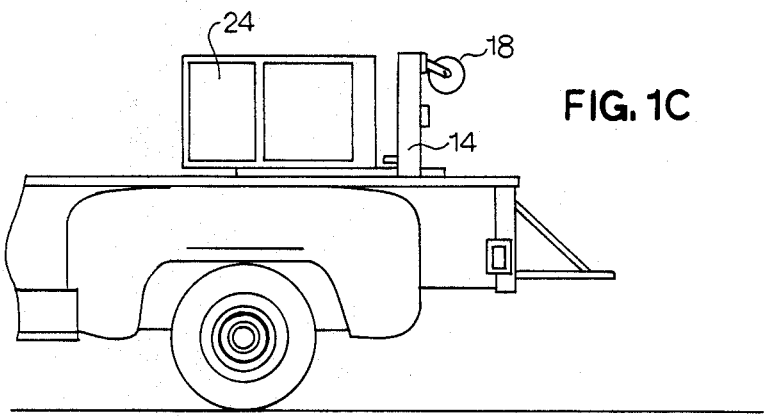

Turning first to FIGS. 1A-1C there is shown a mobile work platform (moveable pedestal scaffold) in accordance with the present invention positioned for loading onto an elevated surface. The elevated surface 10 is shown as a pick-up truck, but may be a loading dock or any other surface of higher elevation. Positioned for loading in FIG. 1A and shown leaning against the elevated surface is a mobile work platform (moveable pedestal scaffold) indicated generally by the numeral 12. This apparatus includes a base member 14, which is typically equipped with wheels 16 and casters 18 on the bottom thereof. Extending up from the base is side member 20, which in most embodiments of mobile platforms supports a lift mechanism 22 for elevating the operators chamber 24.

Figure 2:
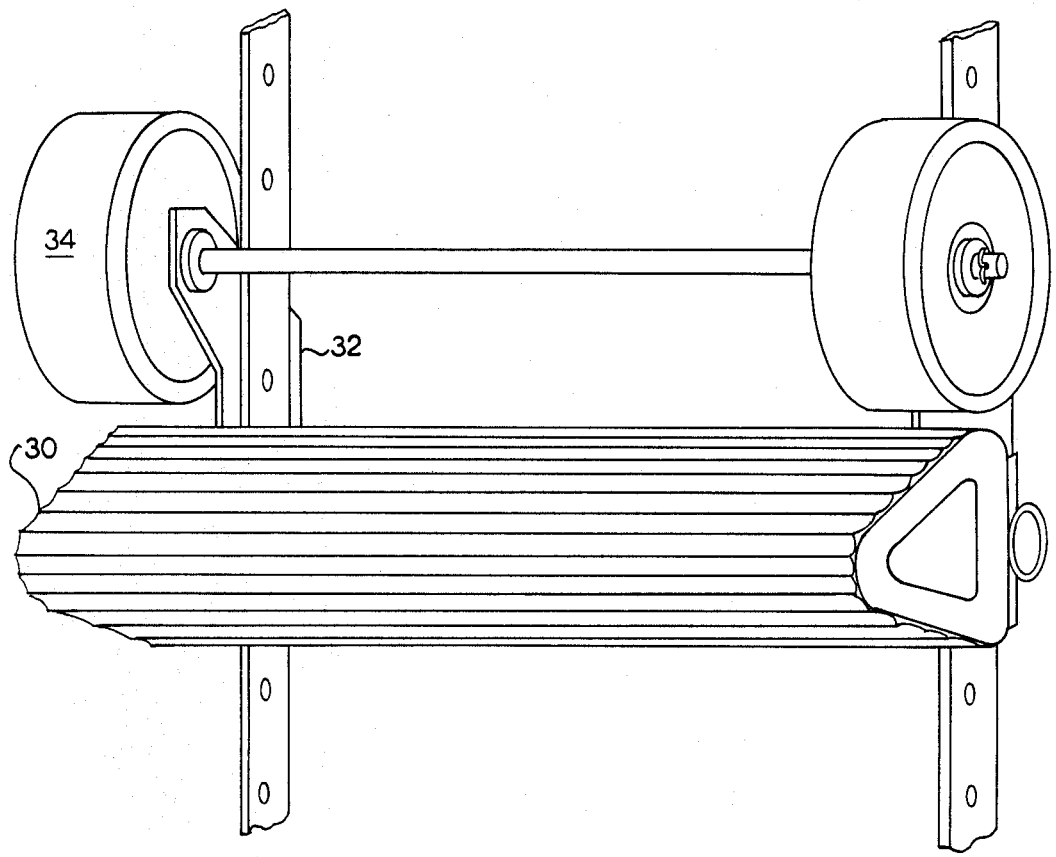
FIG. 2 depicts an isolated perspective view of the combined pivot and wheel improvement of the present invention.
Figure 3:
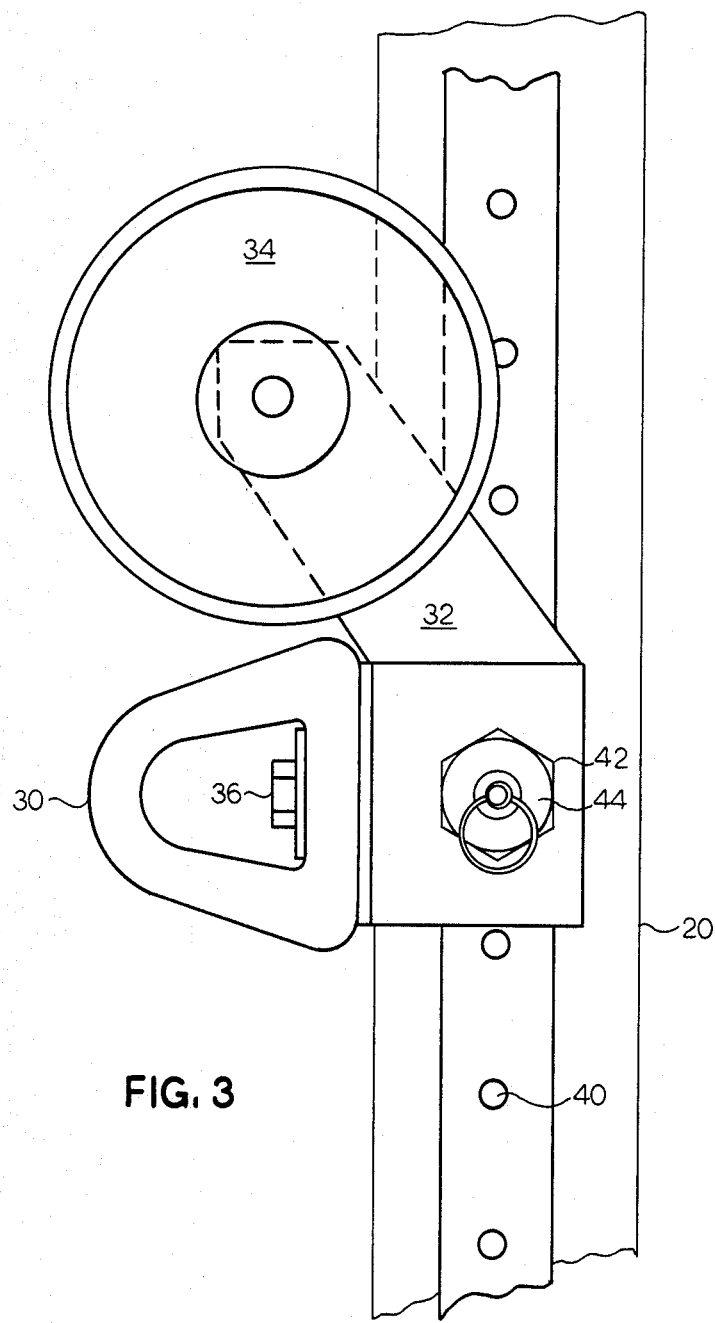
FIG. 3 is a detailed side view of the pivot and wheel improvement of the present invention.

Also affixed to the upright side member 20 there is provided the pivot and wheel combination 26 of the present invention. Turning to FIGS. 2 and 3 greater detail of the pivot and wheel improvement can be seen. Particularly, there is shown an elongated pivot 30 of generally triangular cross section positioned transversely to the upright side of the mobile platform.

This pivot is designed to grip the elevated surface, and in the preferred embodiment of the present invention this pivot would be constructed of a rubber type of material with a high coefficient of friction. In yet a further aspect of the invention the pivot could maintain, defined thereon, a series of longitudinally oriented ribs or ridges to further enhance the surface engaging capability.

A bracket member 32 holds the pivot affixed at each of its ends such that the pivot is arranged to move with the brakcet member whenever it is moved for vertical adjustment. Wheels 34 (or more generally anit-friction means) are provided also on the bracket member proximate to the pivot and arranged to also move with the pivot when the bracket is moved for adjustment.

The rigid bracket member 32 supporting the pivot and the wheels is most clearly shown in FIG. 3. It is arranged to hold the pivot and wheels at a selected vertical elevation of the side of the mobile platform. In the embodiment shown, the pivot is fastened to the bracket by typical bolt and nut means 36, but may be affixed by welding or any other equivalent known in the art. The bracket further operates to secure the pivot at a selected distance or dimension away from the side 20 of the mobile platform. The wheel supporting portion of the bracket protrudes angularly from the pivot anchoring portion of the bracket and is arranged to position the wheels proximate the pivot and to extend slightly beyond the protruding dimension of the pivot. These wheels (or any equivalent functioning anti-friction means) are thus arranged to contact the elevated surface after contact of the pivot, and then to support the apparatus during final rolling positioning on the elevated surface.

In a further aspect of the present invention, there is shown in FIG. 3 an adjustment mechanism having spaced holes 40 located on the side of the mobile platform 20. The bracket member 32 has located therein a key receiving hole 42 arranged to accept a key 44 for securing the bracket to the mobile platform side at the spaced holes. This key may comprise a bolt and nut or any other equivalent means in the art.

The use of this improvement to load the apparatus upon an elevated surface may be described as follows. The operator moves the mobile platform to a position next to the elevated surface (FIG. 1A) and then adjusts the bracket member by use of the key and spaced holes to the proper position. The adjusted height would be such that the center of the pivot is near but just above the height of the elevated surface so the bottom of the pivot is in contact with the edge of the elevated surface. Now the operator can tilt the apparatus toward the elevated surface (FIG. 1B) by lifting on the base of the apparatus. To ease the task of lifting, an operator may use an assist bar 50 removeably attached to the base of the mobile platform to gain additional leverage. In that case the operator would attach the assist bar and lift on it instead of lifting on the base.

As the mobile platform is lifted and tilted onto the elevated surface, the pivot contacts the elevated surface and frictionally engages the surface to provide an axis of pivotal rotation. This maintains the side of the mobile platform apparatus secure against the elevated surface while the lifting is completed. As the apparatus finally approaches the horizontal position, the wheels will make contact with the surface. Due to the limited protrusion of the circumference of the wheels beyond the pivot, the weight of the mobile platform will not be transferred to the wheels until the apparatus is virtually horizontal. At this point very little weight is left to be supported by the operator and the apparatus may be easily lifted from the pivot contact and rolled upon the wheels without difficulty.

From the foregoing description, it will be apparent that modifications can be made to the apparatus and method for using same without departing from the teaching of the present invention. Accordingly, the scope of the invention is only to be limited as necessitated by the claims.

I claim:

1. In a mobile work platform apparatus having a base member and a side extension thereof extending upwards from the base, the improvement comprising:
   a surface engaging pivot means fixed to said side of said base member; and
   anti-friction means mounted to said side of said base member proximate said pivot means and arranged to support the weight of the mobile work platform when positioned on its side.

2. The apparatus of claim 1 wherein said pivot means is comprised of a longitudinal member of substantially triangular cross section.

3. The apparatus of claim 2 wherein said pivot means is further comprised of surface engaging frictional material.

4. The apparatus of claim 3 wherein said pivot means further comprises ridges disposed longitudinally along said pivot member.

5. The apparatus of claim 3 wherein the vertical position of said pivot and said anti-friction means is adjustable.

6. The apparatus of claim 5 wherein said anti-friction means and said pivot means are mounted on a bracket member, whereby the vertical position of the bracket may be adjusted and the prearranged relative positions of the pivot and the anti-friction means remain unchanged during the vertical adjustment.

7. The apparatus of claim 6 whereby the anti-friction means is arranged to engage the surface only when the apparatus is substantially horizontal.

8. The apparatus of claim 1 further comprising leverage means protruding from said base for assisting the lifting of the mobile work platform.

9. In a mobile work platform apparatus having a base member and a side extension thereof extending upwards from the base, the improvement comprising:
   a surface engaging pivot means fixed to said side of said base member; and
   anti-friction means mounted to said side of said base member proximate said pivot means and arranged to support the weight of the mobile work platform when positioned on its side,
   wherein said anti-friction means is arranged to engage the surface only when the apparatus is substantially horizontal.

10. The apparatus of claim 9 wherein said pivot means is comprised of a longitudinal member of substantially triangular cross section.

11. The apparatus of claim 10 wherein said pivot means is further comprised of surface engaging frictional material.

12. The apparatus of claim 11 wherein said pivot means further comprises ridges disposed longitudinally along said pivot member.

13. The apparatus of claim 11 wherein the vertical position of said pivot and said anti-friction means is adjustable.

14. The apparatus of claim 13 wherein said anti-friction means and said pivot means are mounted on a single bracket member, whereby the vertical position of the bracket may be adjusted and the prearranged relative positions of the pivot and the anti-friction means remain unchanged during the vertical adjustment.

15. The apparatus of claim 8 further comprising leverage means protruding from said base for assisting the lifting of the mobile work platform.

* * * * *